(12) United States Patent
Miller et al.

(10) Patent No.: US 11,051,368 B2
(45) Date of Patent: Jun. 29, 2021

(54) WOVEN SMART SUSCEPTOR HEAT BLANKETS

(71) Applicant: The Boeing Company, Chicago, IL (US)

(72) Inventors: Robert J. Miller, Fall City, WA (US); Christopher J. Hottes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 14/937,472

(22) Filed: Nov. 10, 2015

(65) Prior Publication Data

US 2017/0135156 A1 May 11, 2017

(51) Int. Cl.
  *H05B 3/36* (2006.01)
  *H05B 1/02* (2006.01)
  *H05B 6/10* (2006.01)

(52) U.S. Cl.
  CPC ............. *H05B 3/36* (2013.01); *H05B 1/0202* (2013.01); *H05B 1/0272* (2013.01); *H05B 6/105* (2013.01); *H05B 2206/023* (2013.01)

(58) Field of Classification Search
  CPC ...... B60N 2/002; B60N 2/5685; G01R 27/02; H01B 19/04; H01B 5/00; H01L 33/641; H05K 1/00; D04B 1/12; H05B 2203/003; H05B 2203/011; H05B 2203/013; H05B 2203/016; H05B 2203/029; H05B 2203/037; H05B 3/02; H05B 3/34; H05B 1/0202; H05B 1/0272; H05B 2206/023; H05B 3/36; H05B 6/105; H05B 6/40; H05B 6/106; H05B 6/36; H05B 6/06; H05B 6/10; H05B 6/00; H05B 6/04; H05B 6/362; H05B 1/02; H05B 2203/007; H05B 3/56; H05B 2203/014; H05B 6/02; H05B 3/342; Y10T 29/49155; Y10T 442/339; Y10T 442/3236; Y10T 442/3252; Y10T 442/3228; D10B 2401/20; D10B 2401/16; D10B 2501/00; D10B 2101/20;
(Continued)

(56) References Cited

U.S. PATENT DOCUMENTS 4,313,777 A * 2/1982 Buckley ............. B29C 65/3676
  156/272.2
5,012,125 A * 4/1991 Conway ................. H01B 9/028
  174/120 SC
(Continued)

FOREIGN PATENT DOCUMENTS

EP 2806711 A1 11/2014
WO 0234988 A2 5/2002

OTHER PUBLICATIONS

Kestner, et al.; Susceptor Wire Array; U.S. Appl. No. 14/640,227, filed Mar. 6, 2015.
(Continued)

*Primary Examiner* — Tu B Hoang
*Assistant Examiner* — Diallo I Duniver
(74) *Attorney, Agent, or Firm* — von Briesen & Roper, s.c.

(57) ABSTRACT

A heating blanket is disclosed. The heating blanket may include a conductor yarn configured to receive electrical current and generate a magnetic field in response to the electrical current, and a plurality of susceptor yarns composed of a magnetic material including a Curie point. The conductor yarn and the plurality of susceptor yarns may be interlaced to form a layer of fabric.

20 Claims, 8 Drawing Sheets

(58) Field of Classification Search
CPC ...... D03D 15/258; D03D 15/00; H01Q 1/273;
G01K 1/02; A41D 31/00; B29C 73/10;
B29C 2035/0811; B29C 2035/0816;
B29C 35/08; B29C 73/30; B29C 35/00;
B29C 73/34; B29C 35/0805; B29C 35/02;
B29C 35/002; B29C 35/0288; B29C
70/342; B29K 2105/12; B29K 2063/00;
B29K 2307/04; B29K 2105/253; B29K
2105/089; C22C 38/08; Y02P 10/253;
Y02P 10/25; B29L 2031/3076
USPC ...... 174/126.2, 117 M, 126.4; 219/201, 204,
219/529, 545, 528, 634–635, 212, 211,
219/516, 517, 505, 618–619, 549, 603,
219/638, 660–665, 671; 29/846, 602.1,
29/592–592.1, 601; 324/658; 139/420;
442/209, 210, 212, 229, 181, 228
See application file for complete search history.

(56) References Cited

U.S. PATENT DOCUMENTS

| | | | |
|---|---|---|---|
| 5,906,004 A * | 5/1999 | Lebby | A41D 31/00 139/425 R |
| 6,080,690 A * | 6/2000 | Lebby | A41D 31/00 139/420 R |
| 6,852,395 B2 * | 2/2005 | Dhawan | B01D 39/083 428/196 |
| 7,034,251 B1 * | 4/2006 | Child | H05B 3/342 219/212 |
| 8,330,086 B2 | 12/2012 | Miller et al. | |
| 2003/0211797 A1 * | 11/2003 | Hill | D03D 1/0088 442/205 |
| 2006/0057415 A1 * | 3/2006 | Watson | D02G 3/12 428/605 |
| 2008/0128078 A1 * | 6/2008 | May | B29C 73/10 156/272.4 |
| 2011/0139769 A1 * | 6/2011 | Miller | B29C 73/30 219/634 |
| 2012/0145702 A1 | 6/2012 | Miller et al. | |

OTHER PUBLICATIONS

Miller, et al.; Parallel Wire Conductor for Use With a Heating Blanket; U.S. Appl. No. 14/640,217, filed Mar. 6, 2015.
Search Report for related European Application No. EP16183624.2; report dated Mar. 31, 2017.

* cited by examiner

WOVEN SMART SUSCEPTOR HEAT BLANKETS

FIELD OF THE DISCLOSURE

The present disclosure relates generally to heating blankets and, more particularly, to a textile heating blanket and method of manufacturing the same.

BACKGROUND OF THE DISCLOSURE

Heating blankets can be used for many different purposes. For example, heating blankets may be used in homes and hospitals to keep beds and occupants warm. In another example, heating blankets may be used in manufacturing and repair of composite structures by providing a localized application of heat. However, conventional heating blankets do not provide uniform temperatures across an area that is being heated. As a result, differential heating across the area causes certain spots to be over-heated while other spots are under-heated.

SUMMARY OF THE DISCLOSURE

In accordance with one embodiment, a heating blanket is disclosed. The heating blanket may include a conductor yarn configured to receive electrical current and generate a magnetic field in response to the electrical current, and a plurality of susceptor yarns composed of a magnetic material including a Curie point. The conductor yarn and the plurality of susceptor yarns may be interlaced to form a layer of fabric.

In a refinement, the layer of fabric may be sandwiched between a first layer and a second layer.

In another refinement, each of the first layer and the second layer may be composed of a fabric material.

In another refinement, the conductor yarn may comprise a Litz wire.

In another refinement, the conductor yarn may comprise multiple parallel circuits of Litz wire.

In another refinement, the plurality of susceptor yarns may comprise a plurality of alloy susceptor wires.

In another refinement, the plurality of alloy susceptor wires may include at least a first alloy susceptor wire having a first Curie point and a second alloy susceptor wire having a second Curie point different than the first Curie point.

In another refinement, the conductor yarn may be a weft yarn and the plurality of susceptor yarns may be warp yarns.

In another refinement, the conductor yarn and the plurality of susceptor yarns may be woven together.

In another refinement, the conductor yarn and the plurality of susceptor yarns may be woven together in a plain weave pattern.

In another refinement, the conductor yarn and the plurality of susceptor yarns may be knitted together.

In another refinement, the conductor yarn and each of the plurality of susceptor yarns may include insulators composed of one of nylon or polyester.

In accordance with another embodiment, a heating blanket is disclosed. The heating blanket may include a first layer and a second layer composed of a fabric material, and an internal layer sandwiched between the first layer and the second layer. The internal layer may be formed of a conductor yarn woven together with a plurality of susceptor yarns. The conductor yarn may be configured to receive electrical current and generate a magnetic field in response to the electrical current. The plurality of susceptor yarns may be composed of a magnetic material including a Curie point and configured to generate heat in response to the magnetic field generated by the conductor yarn.

In a refinement, the conductor yarn may comprise a Litz wire.

In another refinement, the plurality of susceptor yarns may comprise a plurality of alloy susceptor wires.

In another refinement, the conductor yarn and the plurality of susceptor yarns may be woven together in one of a plain weave, twill weave, satin weave, or knitted pattern.

In another refinement, the fabric material may comprise one of cotton, polyester, or a combination thereof.

In another refinement, each of the plurality of susceptor yarns and the conductor yarn may include an insulator.

In another refinement, the insulator may be composed of one of nylon or polyester.

In accordance with another embodiment, a method of manufacturing a heating blanket is disclosed. The method may include selecting a plurality of susceptor warp yarns and a conductor weft yarn, the conductor weft yarn configured to receive electrical current and generate a magnetic field in response to the electrical current, the plurality of susceptor warp yarns composed of a magnetic material including a Curie point; weaving the plurality of susceptor warp yarns and the conductor weft yarn together to form a fabric; and connecting a power supply to the conductor weft yarn.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
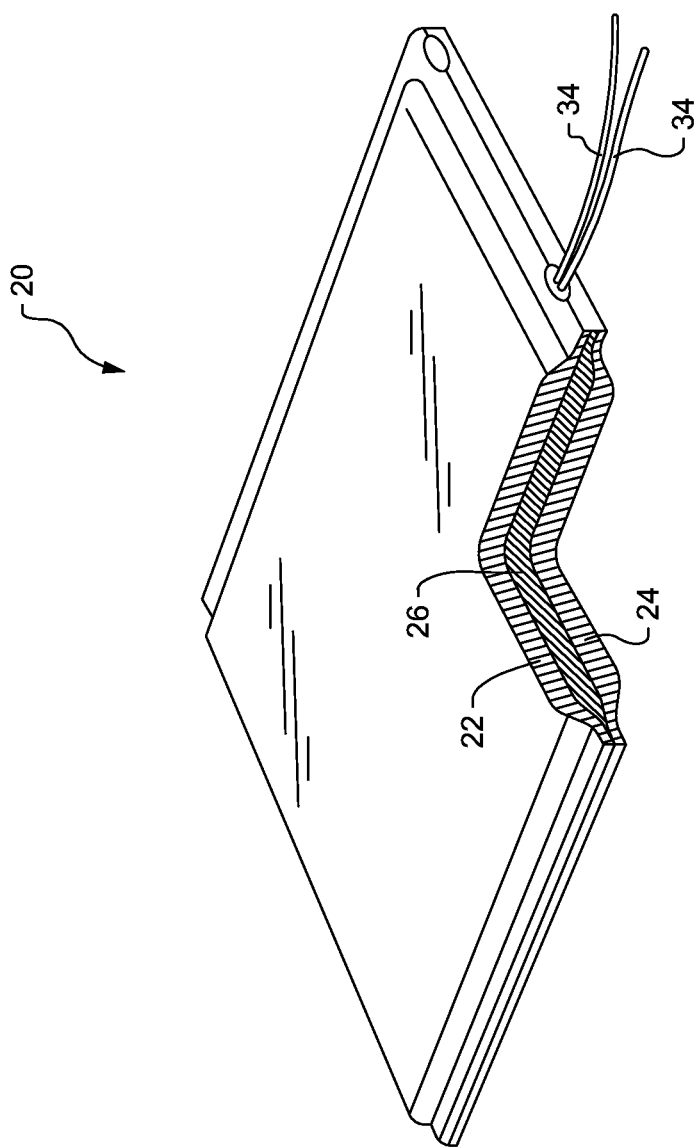
FIG. 1 is a perspective cutaway view of a heating blanket, in accordance with one embodiment of the present disclosure.

FIG. 1 illustrates a cross-sectional view of a heating blanket 20, in accordance with an embodiment of the present disclosure. The heating blanket 20 may comprise a first layer 22, a second layer 24, and a smart fabric layer 26 sandwiched therebetween. Each of the first layer 22 and the second layer 24 is composed of a fabric material, such as natural or manmade fabrics. Examples of fabrics include cotton, polyester, and a combination thereof. However, other fabric or non-fabric materials may be used for the first and second layers 22, 24.

The heating blanket 20 may have more layers than the first layer 22 and the second layer 24 surrounding the internal smart fabric layer 26. Furthermore, the heating blanket 20 may have more than one smart fabric layer 26, such as multiple smart fabric layers stacked together. In another embodiment, the heating blanket 20 may comprise the smart fabric layer(s) 26 without any surrounding layers, such as the first layer 22 or the second layer 24.

Figure 2:
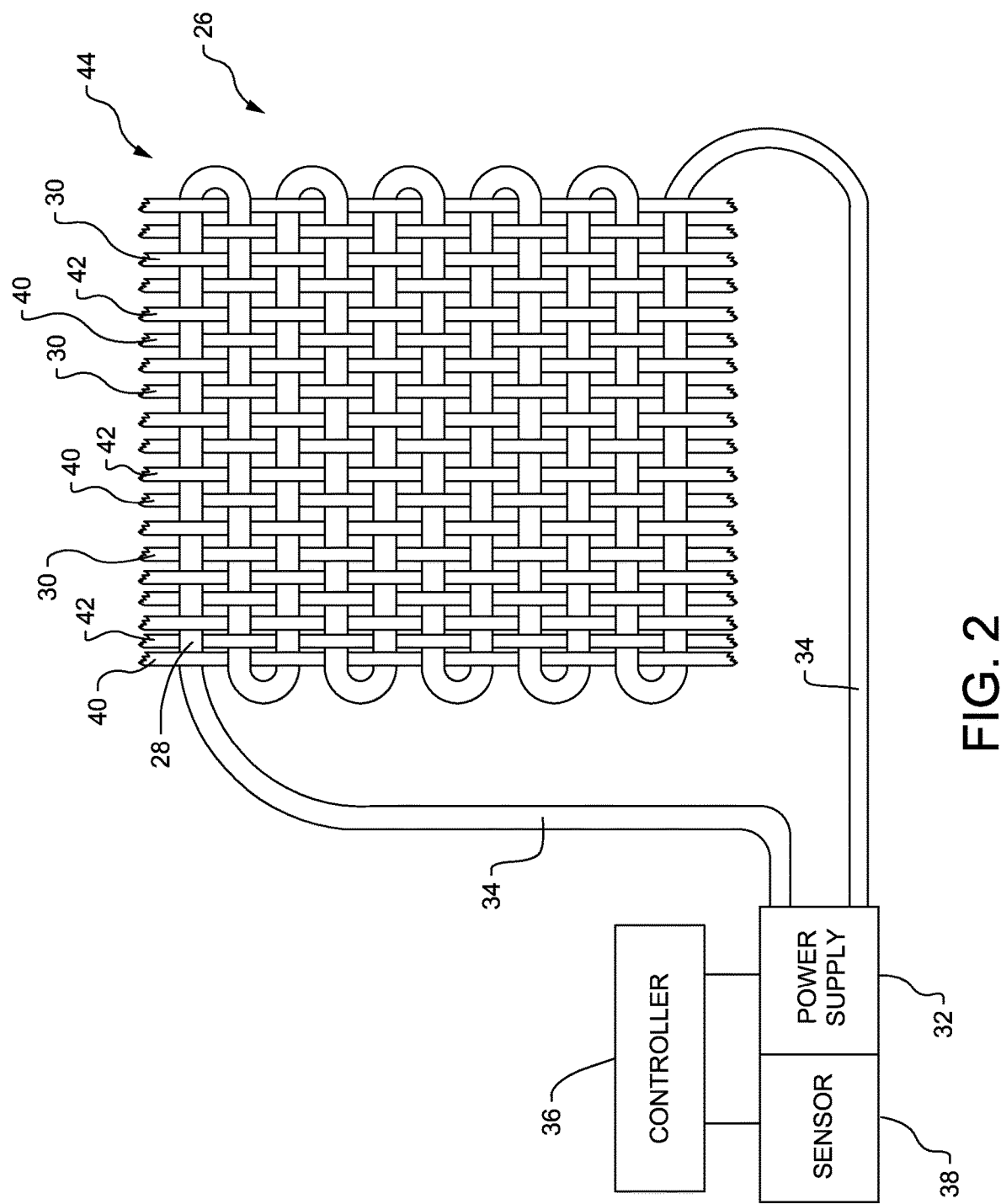
FIG. 2 is a schematic view of a smart fabric layer, in accordance with another embodiment.

Referring now to FIG. 2, with continued reference to FIG. 1, the smart fabric layer 26 is shown, in accordance with an embodiment of the present disclosure. The smart fabric layer 26 may comprise at least one conductor yarn 28 and a plurality of susceptor yarns 30 interlaced to form a layer of fabric. As used herein, the term "yarn" may refer to a solid strand or multiple fibers plied together into a single cord. The conductor yarn 28 is configured to receive an electrical current and generate a magnetic field in response to the electrical current. In one example, the conductor yarn 28 may comprise a Litz wire, although other suitable types of conductors can be used as well.

The conductor yarn 28 is operatively connected to a portable or fixed power supply 32, such as via wiring 34. The power supply 32 may provide alternating current electrical power to the conductor yarn 28 and may be connected to a conventional electrical outlet. In addition, the power supply 32 may operate at higher frequencies. For example, the minimum practically frequency may be approximately ten kilohertz, and the maximum practical frequency may be approximately four hundred kilohertz. However, other frequencies may be used. Furthermore, the power supply 32 may be connected to a controller 36 and a voltage sensor 38 or other sensing device configured to indicate a voltage level provided by the power supply 32. Based on the indicated voltage level from the voltage sensor 38, the controller 36 may adjust the alternating current of the power supply 32 over a predetermined range in order to facilitate application of the heating blanket 20 to various heating requirements.

The plurality of susceptor yarns 30 are configured to generate heat in response to the magnetic field generated by the conductor yarn 28. More specifically, the plurality of susceptor yarns 30 absorb electromagnetic energy from the conductor yarn 28 and convert that energy to heat. Furthermore, the plurality of susceptor yarns 30 are composed of a magnetic material having a Curie point. The Curie point is a temperature at which the plurality of susceptor yarns 30 becomes non-magnetic.

Upon approaching the Curie point, the heat generated by the plurality of susceptor yarns 30 decreases. For example, if the Curie point of the magnetic material for the plurality of susceptor yarns 30 is 125° F., the plurality of susceptor yarns 30 may generate two Watts per square inch at 100° F., may decrease heat generation to one Watt per square inch at 110° F., and may further decrease heat generation to 0.5 Watts per square inch at 120° F. As such, portions of the heating blanket 20 that are cooler due to larger heat sinks generate more heat and portions of the heating blanket 20 that are warmer due to smaller heat sinks generate less heat, thereby resulting in all portions of the heating blanket 20 arriving at approximately a same equilibrium temperature and reliably providing uniform temperature over the entire heating blanket 20.

Thus, the smart fabric layer 26 may provide uniform application of heat to an area to which the heating blanket 20 is applied, compensating for heat sinks that draw heat away from portions of the area that is being heated by the blanket 20. For example, the smart fabric layer 26 will continue to heat portions of the area that have not reached the Curie point, while at the same time, ceasing to provide heat to portions of the area that have reached the Curie point. In so doing, the temperature-dependent magnetic properties, such as the Curie point of the magnetic material used in the plurality of susceptor yarns 30, may prevent over-heating or under-heating of areas to which the heating blanket 20 is applied.

The magnetic material of the plurality of susceptor yarns 30 may be provided in a variety of compositions, such as a metal, an alloy, a metal oxide, a ferrite, and any other suitable material having a Curie point that approximates any desired temperature. For instance, the plurality of susceptor yarns 30 may comprise a plurality of alloy susceptor wires. In one example, the plurality of susceptor yarns 30 may be composed of Alloy 31, which has 31% Ni and 69% Fe and a Curie point of about 180° F.

In other examples, the magnetic material of the plurality of susceptor yarns 30 may comprise Alloy 30, which has 30% Ni and 70% Fe and a Curie point of about 100° F., or Alloy 34, which has 34% Ni and 66% Fe and a Curie point of about 400° F. However, other compositions may be used for the magnetic material of the plurality of susceptor yarns 30. In addition, the heat generation of the plurality of susceptor yarns 30 may also depend on other factors, such as a diameter of each yarn and a gauge of the susceptor wires. Although such factors may impact the watts per square inch generated in the heating blanket 20, the Curie point of the plurality of susceptor yarns 30 will still determine the ultimate temperature of the heating blanket 20.

Moreover, the plurality of susceptor yarns 30 may include two or more different magnetic materials. For example, the plurality of susceptor yarns 30 may include a plurality of first susceptor yarns 40 composed of a first magnetic material and a plurality of second susceptor yarns 42 composed of a second magnetic material. The first magnetic material of the plurality of first susceptor yarns 40 may have a different Curie point than a Curie point of the second magnetic material of the plurality of second susceptor yarns 42. In another example, each of the plurality of susceptor yarns 30 may be composed of two or more different magnetic materials wound together into a single strand. By incorporating different magnetic materials having different Curie points into the plurality of susceptor yarns 30, increased temperature regulation over a wider range of temperatures may be achieved by the smart fabric layer 26.

Together the conductor yarn 28 and the plurality of susceptor yarns 30 can be interlaced in various patterns and by various processes to form a fabric or textile for the smart fabric layer 26. In one example, the conductor yarn 28 may be a weft yarn and the plurality of susceptor yarns 30 may be warp yarns. For instance, the conductor yarn 28 and the plurality of susceptor yarns 30 may be woven together, such as in a plain weave 44.

Figure 3:
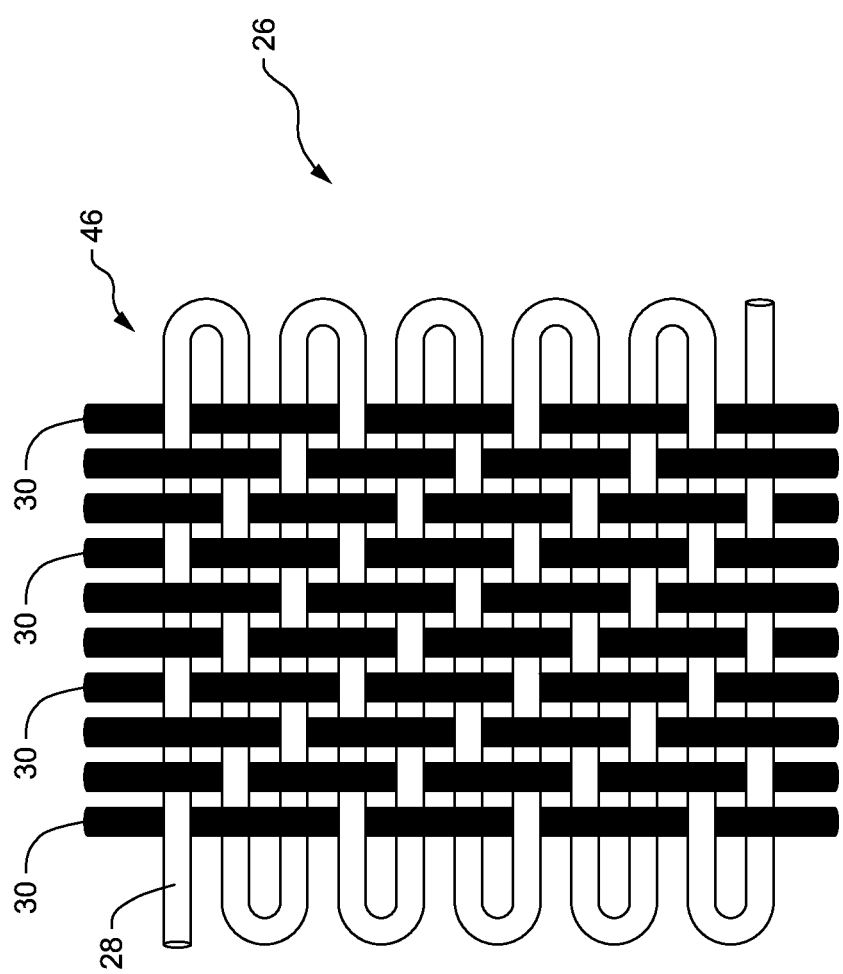
FIG. 3 is a side view of a smart fabric layer including a twill weave pattern, in accordance with another embodiment.
Figure 4:
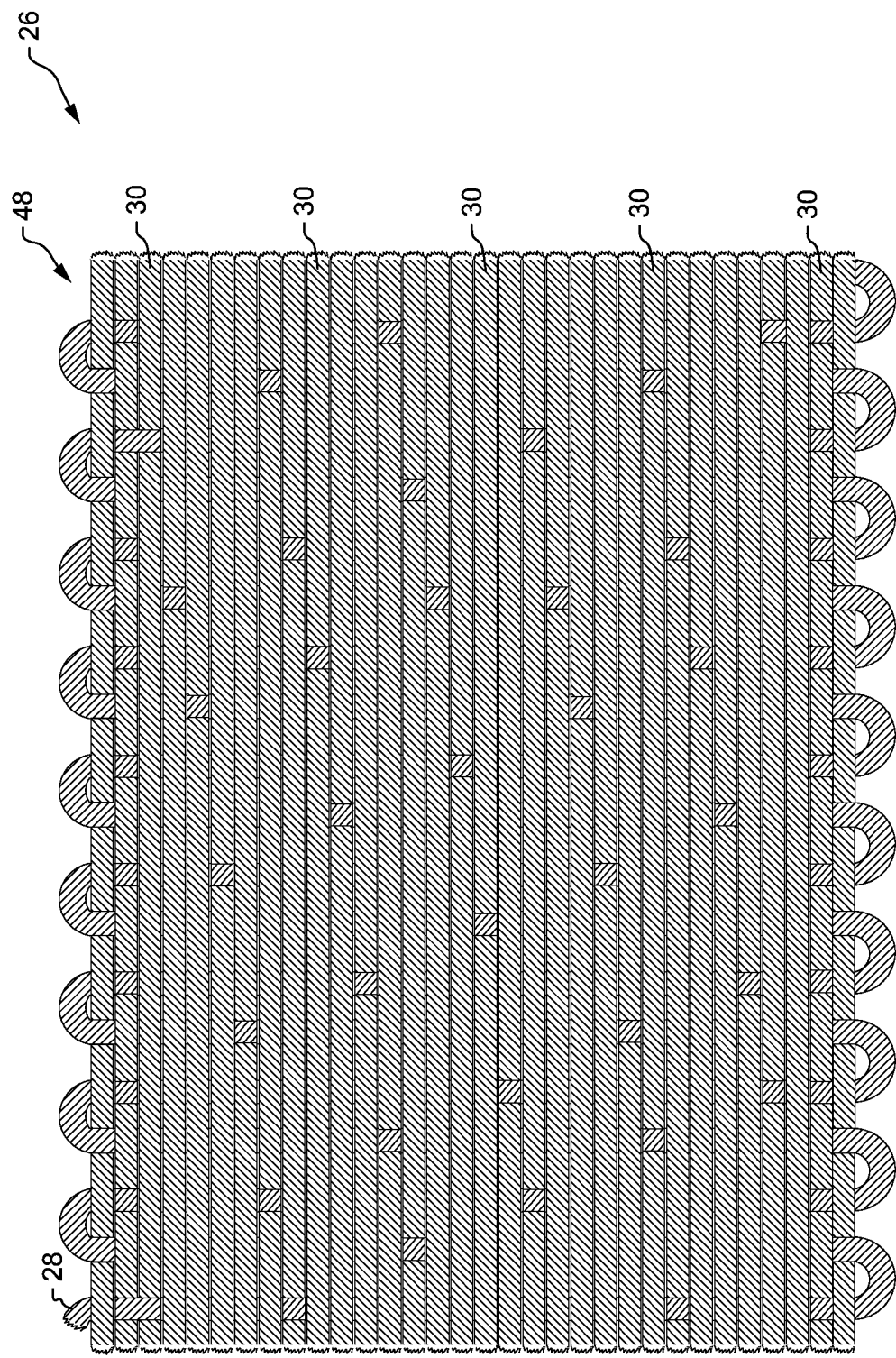
FIG. 4 is a side view of a smart fabric layer including a satin weave pattern, in accordance with another embodiment.
Figure 5:
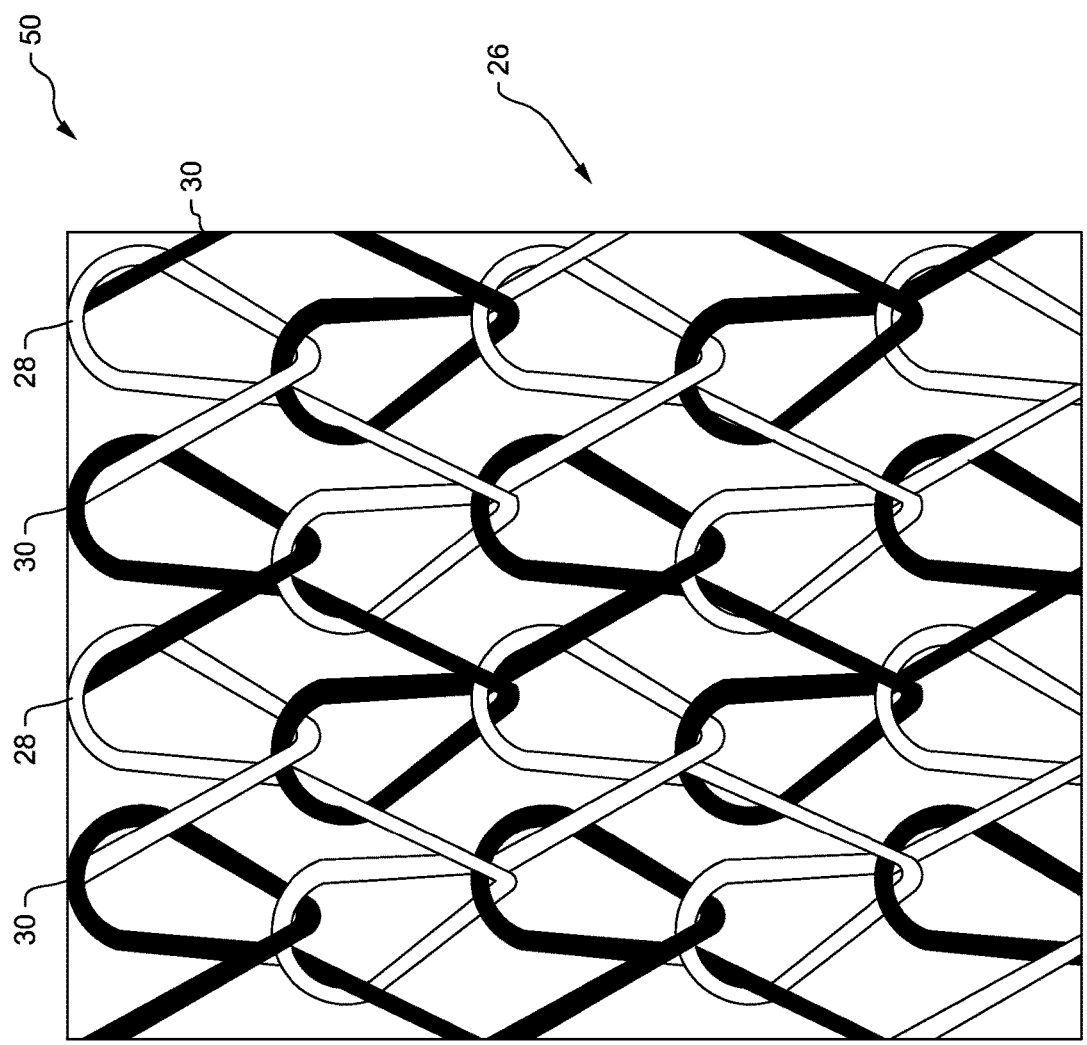
FIG. 5 is a side view of a smart fabric layer including a knit pattern, in accordance with another embodiment.

Other weave patterns for the conductor yarn 28 and the plurality of susceptor yarns 30 may include a twill weave 46, shown in FIG. 3, or a satin weave 48, shown in FIG. 4, although any type of weave pattern may be used. In another example, the conductor yarn 28 and the plurality of susceptor yarns 30 may be knitted together in a knitted pattern 50, as shown in FIG. 5. However, other fabric or textile producing processes than weaving and knitting may be used to form the smart fabric layer 26 as well. A proximity of the conductor yarn 28 to the plurality of susceptor yarns 30 may be within an inclusive range of about twenty thousandths of an inch (mil) to one hundred mil, although other distances may be used. Furthermore, if the proximity of the conductor yarn 28 to the plurality of susceptor yarns 30 is greater than one hundred mil, increased current may be applied to the conductor yarn 28 in order to achieve heat generation.

Figure 6:
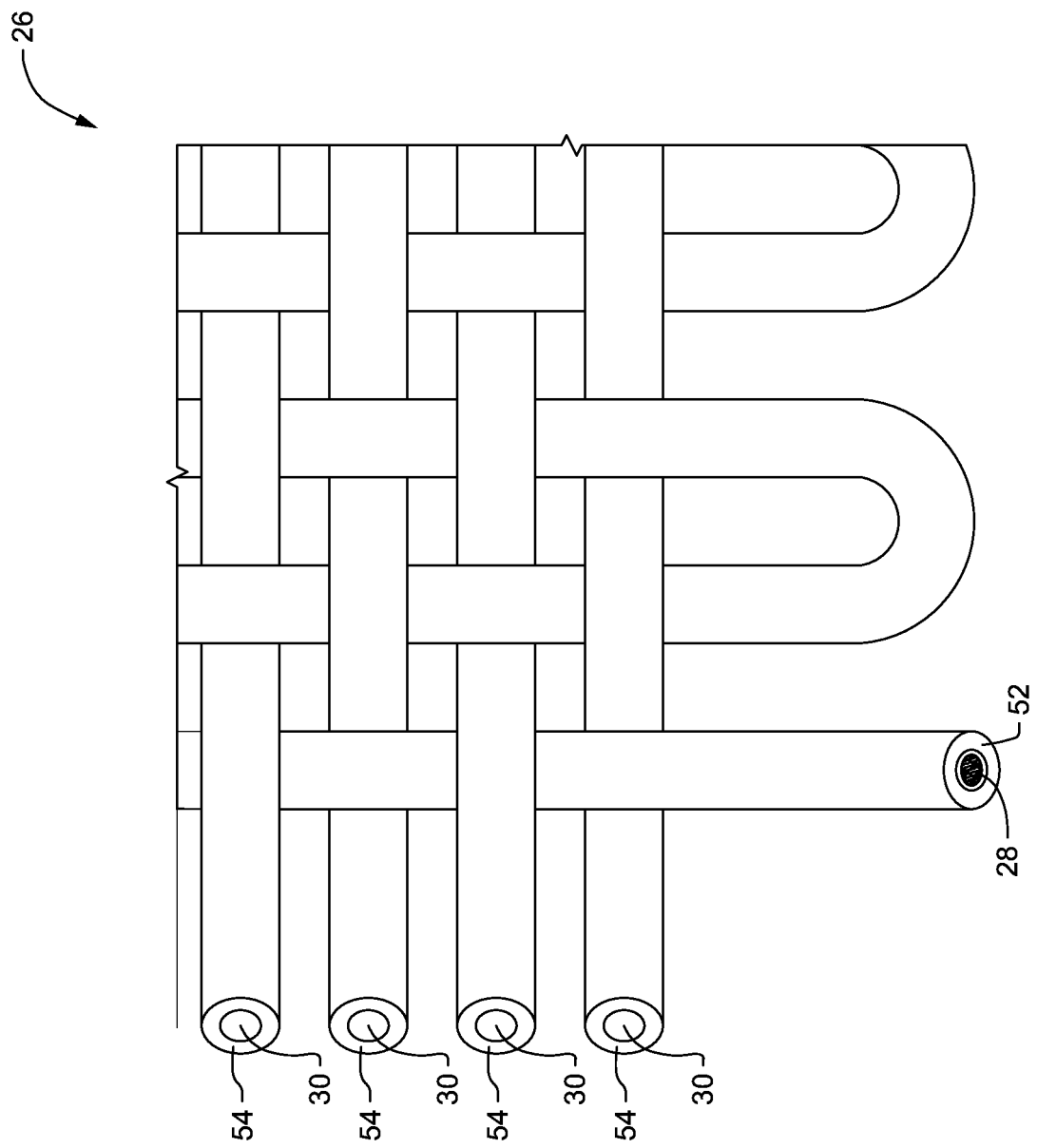
FIG. 6 is an enlarged cutaway view of the smart fabric layer of FIG. 2.

Referring now to FIG. 6, with continued reference to FIGS. 1-5, the conductor yarn 28 may include an insulator 52. For instance, if the conductor yarn 28 comprises a Litz wire, such as one hundred twenty-five strands of forty American Wire Gauge (AWG) with a fluorinated ethylene propylene (FEP) or other fluoropolymer insulation on the individual strands, the insulator 52 may be an additional layer of insulation surrounding the bundle of strands in the Litz wire. The insulator 52 may comprise a coating composed of nylon, polyester, synthetic fabric, natural fabric, or other material. In the example, the insulator 52 may be ten thousandths of an inch (mil) thick, although other thicknesses may be used. Furthermore, it is understood that the above configurations for the conductor yarn 28 and the insulator 52 are examples only and that other configurations may be used.

In addition, each of the plurality of susceptor yarns 30 may include an insulator 54. For example, if each of the plurality of susceptor yarns 30 comprises a twenty mil diameter Alloy 31 wire, each insulator 54 may surround each wire and comprise a coating composed of nylon, polyester, synthetic fabric, natural fabric, or other material. In the example, the insulators 54 may be ten mil thick each, although other thicknesses may be used. Furthermore, it is understood that the above configurations for the plurality of susceptor yarns 30 and the insulators 54 are examples only and that other configurations may be used. By providing insulators 52, 54 on the conductor yarn 28 and the plurality of susceptor yarns 30, the heating blanket 20 may solely be comprised of the smart fabric layer 26 without a need for surrounding layers, such as the first layer 22 and the second layer 24 in FIG. 1.

Figure 7:
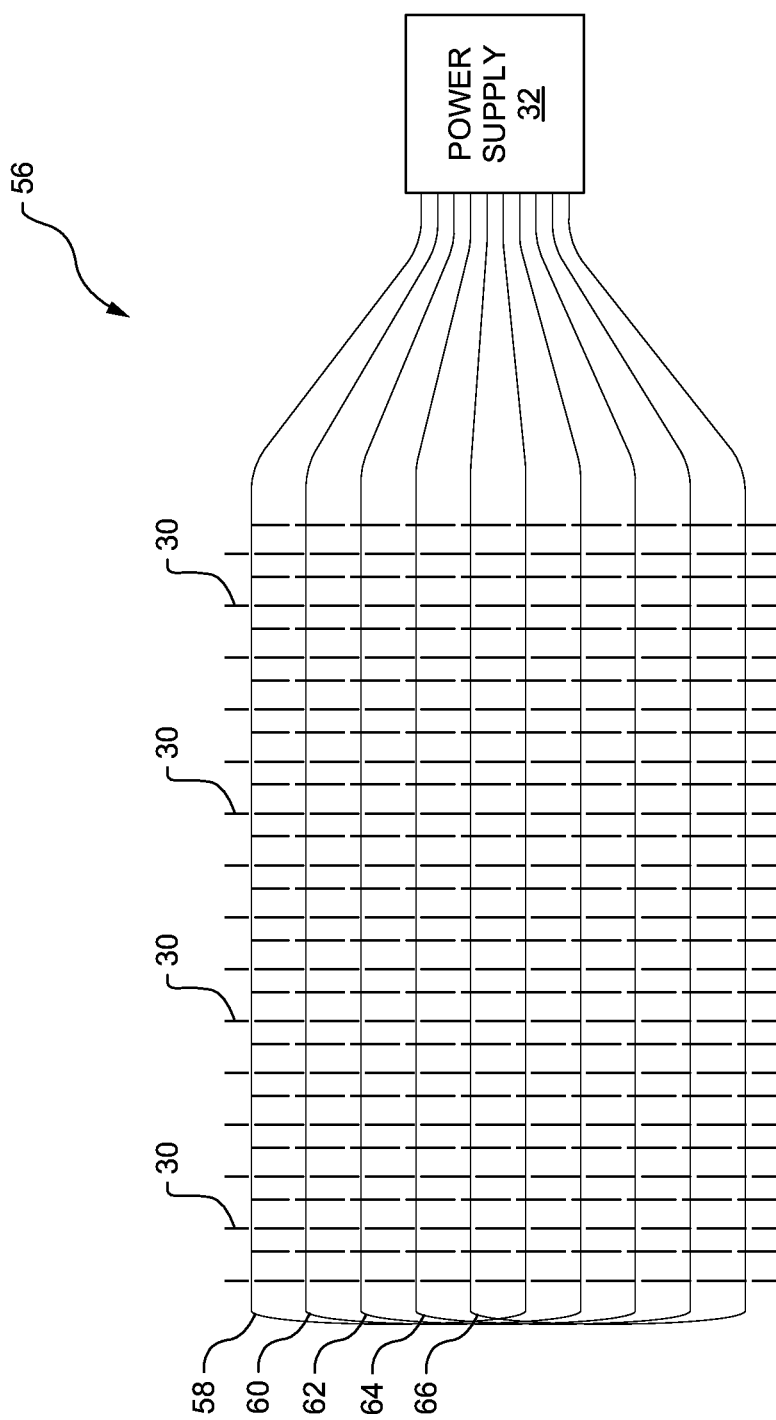
FIG. 7 is a schematic view of a smart fabric layer including multiple parallel circuits of conductor yarns, in accordance with another embodiment.

Turning now to FIG. 7, with continued reference to FIGS. 1-6, a smart fabric layer 56 may include a plurality of conductor yarns 58, 60, 62, 64, 66. Each of the plurality of conductor yarns 58, 60, 62, 64, 66 may comprise a Litz wire connected to the power supply 32 in parallel. The plurality of susceptor yarns 30 may be interlaced with the plurality of conductor yarns 58, 60, 62, 64, 66 to form a single layer of fabric. For example, multiple parallel circuits of conductor yarns 58, 60, 62, 64, 66 may be incorporated into the smart fabric layer 56 in order to decrease a voltage necessary to drive the electrical current over a large sized heating blanket 20. Although the smart fabric layer 56 has five conductor yarns 58, 60, 62, 64, 66, any number of conductor yarns or parallel circuits may be used.

In general, the foregoing disclosure provides numerous technical effects and benefits in various applications relating to heating blankets. For example, the disclosed heating blanket can be used in hospitals and homes, in industrial applications during manufacturing and repair of composite structures, and in other applications. The disclosed heating blanket provides uniform, controlled heating of surface areas. More specifically, the Curie point of the susceptor yarns in the smart fabric layer is used to control temperature uniformity in the area to which the heating blanket is applied. All portions of the area being heated may achieve the same temperature, such as the Curie point of the susceptor yarns, thereby helping to prevent over-heating or under-heating of certain portions of the area being heated.

Furthermore, by providing a configuration of interlaced conductor yarn(s) and susceptor yarns as a fabric layer, the heating blanket does not necessarily need a matrix, or a medium to embed the conductor yarn and susceptor yarns in. Although the matrix helps conduct heat to the area covered by the blanket, it may contribute added weight and stiffness. Thus, without the matrix, the open weave configuration of the smart fabric layer can make for a relatively light weight heating blanket. In addition, the woven heating blanket having only layers of fabric can provide increased flexibility and lower manufacturing costs, while still providing temperature uniformity. However, in another embodiment, the smart fabric layer may be embedded in a matrix without departing from the scope of the disclosure. In addition, by providing insulation to the conductor and susceptor yarns, the smart fabric may be used to make the heating blanket without the need for outer layers.

Figure 8:
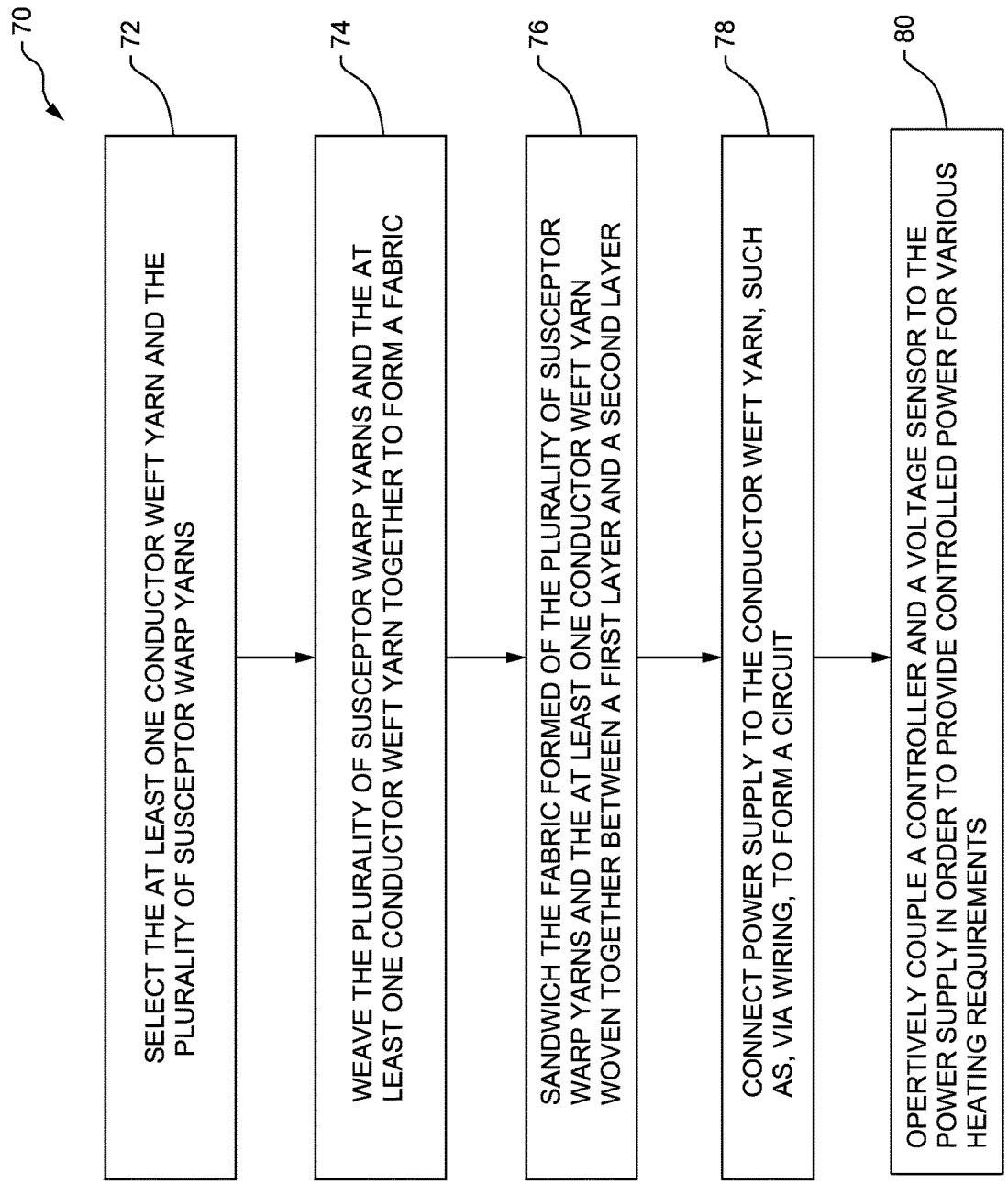
FIG. 8 is a flowchart illustrating a process for manufacturing a heating blanket, in accordance with another embodiment.

Referring now to FIG. 8, with continued reference to FIGS. 1-7, a process 70 for manufacturing a heating blanket 20 is shown, in accordance with another embodiment of the present disclosure. At block 72, the at least one conductor weft yarn 28 and the plurality of susceptor warp yarns 30 may be selected. The conductor weft yarn 28 is configured to receive electrical current and generate a magnetic field in response to the electrical current. The plurality of susceptor warp yarns 30 are composed of a magnetic material including a Curie point. The plurality of susceptor warp yarns 30 are configured to generate heat in response to the magnetic field generated by the conductor weft yarn 28.

For example, a Litz wire may be selected as the at least one conductor weft yarn 28 with or without insulation. The magnetic material(s) for the plurality of susceptor warp yarns 30 may be selected with the desired Curie point(s) based on the heating requirements for which the heating blanket 20 is being applied. Each of the plurality of susceptor warp yarns 30 may also include insulation if desired. In addition, the gauge of wire for the conductor weft yarn 28 and the plurality of susceptor warp yarns 30 may be selected to provide a desired heat density, weight, and flexibility for a specific application of the heating blanket 20.

At block 74, the plurality of susceptor warp yarns 30 and the conductor weft yarn 28 are woven together to form a fabric. For instance, the plurality of susceptor warp yarns 30 and the conductor weft yarn 28 may be interlaced in a plain weave 44, a twill weave 46, a satin weave 48, or a knitted pattern 59. However, other fabric producing processes than weaving and knitting may be used.

At block 76, the fabric formed of the plurality of susceptor warp yarns 30 and the conductor weft yarn 28 woven together may be sandwiched between a first layer 22 and a second layer 24. However, block 76 is optional. In other embodiments, the process 70 may not include block 76 and the heating blanket 20 may only be comprised of the fabric formed of the plurality of susceptor warp yarns 30 and the conductor weft yearn 28 woven together without the outer layers 22, 24. A power supply 32 is connected to the conductor weft yarn 28 to form a circuit, such as via wiring 34, at block 78. At block 80, a controller 36 and a voltage sensor 38 may be operatively coupled to the power supply 32 in order to provide controlled power for various heating requirements.

It is to be understood that the flowchart in FIG. 8 is shown and described as an example only to assist in disclosing the features of the disclosed system and techniques, and that more or less steps than that shown may be included in the process corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A heating blanket, comprising:
    a conductor yarn configured to receive electrical current and generate a magnetic field in response to the electrical current;
    a susceptor formed in a plurality of elongate susceptor yarns interlaced with the conductor yarn to form a layer of fabric, wherein the plurality of susceptor yarns is composed of a susceptor material having a magnetic state at temperatures below a Curie point of the susceptor material and a non-magnetic state at temperatures above the Curie point of the susceptor material, wherein the Curie point of the susceptor material is at least 100 degrees F., and wherein the susceptor material is configured to inductively generate heat in response to the magnetic field of the conductor yarn when the susceptor material is in the magnetic state at temperatures below the Curie point of the susceptor material; and
    a power supply operably coupled to the conductor yarn and configured to generate the electrical current through the conductor yarn at a frequency sufficient to heat the susceptor yarns to the Curie point of the susceptor material.

2. The heating blanket of claim 1, wherein the layer of fabric is sandwiched between a first layer and a second layer.

3. The heating blanket of claim 2, wherein each of the first layer and the second layer is composed of a fabric material.

4. The heating blanket of claim 1, wherein the conductor yarn comprises a Litz wire.

5. The heating blanket of claim 1, wherein the conductor yarn comprises multiple parallel circuits of Litz wire.

6. The heating blanket of claim 1, wherein the plurality of susceptor yarns comprise a plurality of alloy susceptor wires.

7. The heating blanket of claim 6, wherein the plurality of alloy susceptor wires includes at least a first alloy susceptor wire having a first Curie point and a second alloy susceptor wire having a second Curie point different than the first Curie point.

8. The heating blanket of claim 1, wherein the conductor yarn is a weft yarn and the plurality of susceptor yarns are warp yarns.

9. The heating blanket of claim 1, wherein the conductor yarn and the plurality of susceptor yarns are woven together.

10. The heating blanket of claim 9, wherein the conductor yarn and the plurality of susceptor yarns are woven together in a plain weave pattern.

11. The heating blanket of claim 1, wherein the conductor yarn and the plurality of susceptor yarns are knitted together.

12. The heating blanket of claim 1, wherein the conductor yarn and each of the plurality of susceptor yarns include insulators composed of one of nylon or polyester.

13. A heating blanket, comprising:
    a first layer and a second layer composed of a fabric material;
    an internal layer sandwiched between the first layer and the second layer, the internal layer formed of a conductor yarn woven together with a plurality of elongate susceptor yarns, the conductor yarn configured to receive electrical current and generate a magnetic field in response to the electrical current, the plurality of susceptor yarns composed of a susceptor material having a magnetic state at temperatures below a Curie point of the susceptor material and a non-magnetic state at temperatures above the Curie point of the susceptor material, wherein the Curie point of the susceptor material is at least 100 degrees F., and wherein the susceptor material is configured to inductively generate heat in response to the magnetic field of the conductor yarn when the susceptor material is in the magnetic state at temperatures below the Curie point of the susceptor material; and
    a power supply operably coupled to the conductor yarn and configured to generate the electrical current through the conductor yarn at a frequency sufficient to heat the susceptor yarns to the Curie point of the susceptor material.

14. The heating blanket of claim 13, wherein the conductor yarn comprises a Litz wire.

15. The heating blanket of claim 13, wherein the plurality of susceptor yarns comprise a plurality of alloy susceptor wires.

16. The heating blanket of claim 13, wherein the conductor yarn and the plurality of susceptor yarns are woven together in one of a plain weave, twill weave, satin weave, or knitted pattern.

17. The heating blanket of claim 13, wherein the fabric material comprises one of cotton, polyester, or a combination thereof.

18. The heating blanket of claim 13, wherein each of the plurality of susceptor yarns and the conductor yarn includes an insulator.

19. The heating blanket of claim 18, wherein the insulator is composed of one of nylon or polyester.

20. A method of manufacturing a heating blanket, comprising:
    selecting a plurality of elongate susceptor warp yarns and a conductor weft yarn, the conductor weft yarn configured to receive electrical current and generate a magnetic field in response to the electrical current, the plurality of susceptor warp yarns composed of a susceptor material having a magnetic state at temperatures below a Curie point of the susceptor material and a non-magnetic state at temperatures above the Curie point of the susceptor material, wherein the Curie point of the susceptor material is at least 100 degrees F., and wherein the susceptor material is configured to inductively generate heat in response to the magnetic field of the conductor weft yarn when the susceptor material is in the magnetic state at temperatures below the Curie point of the susceptor material;

weaving the plurality of susceptor warp yarns and the conductor weft yarn together to form a fabric; and connecting a power supply to the conductor weft yarn, wherein the power supply is configured to generate the electrical current through the conductor weft yarn at a frequency sufficient to heat the susceptor warp yarns to the Curie point of the susceptor material.

* * * * *